Dec. 7, 1937.  A. J. HERSCHMANN  2,101,678
NUT LOCK
Filed April 30, 1937
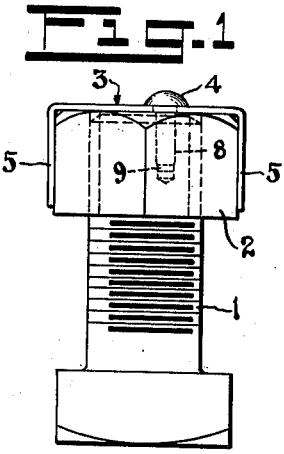
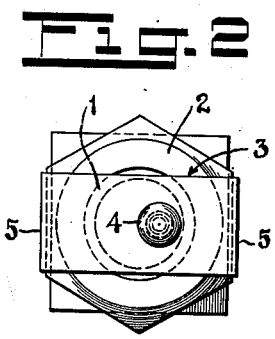
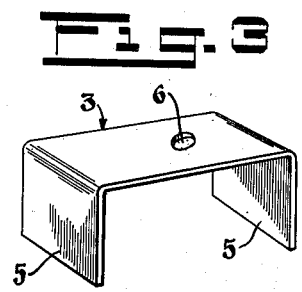
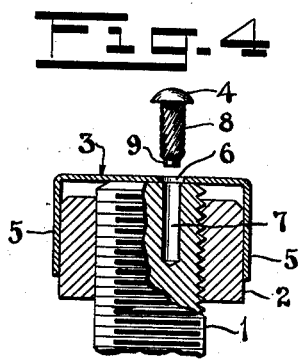
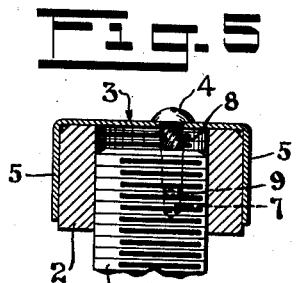
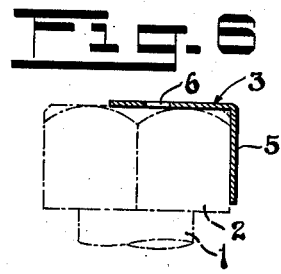
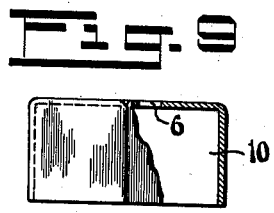
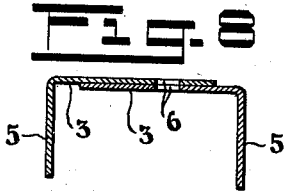
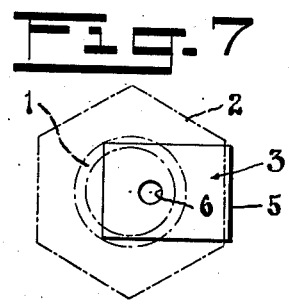
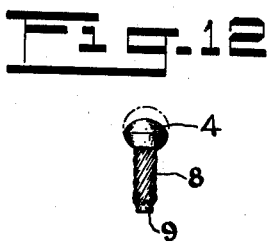
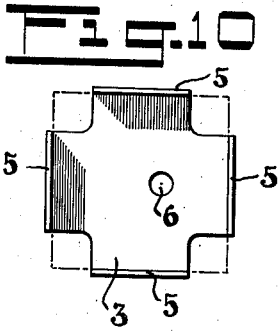
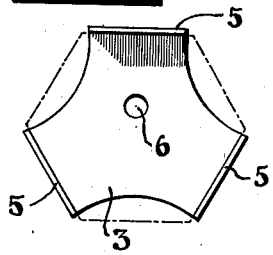
INVENTOR.
Arthur J. Herschmann
BY
ATTORNEY.

Patented Dec. 7, 1937

2,101,678

UNITED STATES PATENT OFFICE 2,101,678

NUT LOCK

Arthur J. Herschmann, New York, N. Y.

Application April 30, 1937, Serial No. 139,863

5 Claims. (Cl. 151—29)

My invention relates to devices for locking a nut on its bolt at any adjusted position for various uses, such for instance as on machinery or apparatus where the bolt and nut is intended to hold two elements together in adjusted working position without binding, or for use in securely clamping two elements together; the purpose of the locking device being to maintain the nut in its set position on the bolt.

Numerous devices have heretofore been proposed for this purpose, but in every instance, excepting lock-washers or auxiliary locking nuts, either the bolt or nut, or both the bolt and nut, were special types. In other words, such means or devices were not designed for use with standard stock bolts and nuts of any size and regular commercial production. Either the bolt or nut, or both, were specially made, or the regular product altered to permit the use or application of a locking device, and in most instances the bolt and nut were weakened by such changes, and in many instances the locking device was capable of locking the nut only at definite points with respect to the bolt.

The main object of my invention is to provide a new method of locking standard nuts on standard bolts, and consists in applying to the nut, after the bolt and nut are in place with the nut screwed to the desired point on the bolt, a locking plate or saddle having one or more right-angle projections or sides adapted to closely contact a flat or opposite flats of the nut, and having a hole in the plate on a line perpendicular to the angular projection and passing through the center of the bolt and located eccentric to the axial center of the bolt; then drilling a hole in the end of the bolt concentric with the hole in the locking plate; and then driving a headed pin through the plate hole and into the bolt hole, whereby the locking plate will be held seated on the nut or bolt end, and the angular projection or projections thereof in close contact with a flat or opposite flats of the nut.

A further object is to provide a locking means capable of use with any and all types and sizes of standard bolts and nuts, or with special bolts and nuts, without altering either the bolt or nut, or without modifying or interrupting the threads, and without requiring added length for either the bolt or nut, and capable of use without special tools. Also to provide a locking means which may be applied to the bolt and nut after they are in position and the nut set to a definite position or screwed to tight clamping position regardless of the locking position of the locking means. A further object is to provide a locking means which may be readily applied and readily removed with the aid of ordinary tools, and which may be as readily applied and function equally as well regardless of whether the bolt end projects above the top of the nut, or the nut does not fully screw onto the bolt.

In carrying my invention into effect I provide a locking plate or saddle of plain strip metal with two right-angle bends to fit the width of the nut when seated thereon and the sides of the saddle thus formed engaging opposite flats of the nut. This saddle is held in position on the nut by a headed pin driven through a hole in the saddle and into a hole drilled into the end of the bolt eccentric to its axis, the hole in the saddle being preferably on the longitudinal center line so that when the saddle is in position on the nut the center of the saddle hole will be on a line passing through the center of the bolt. The saddle will be manufactured in various sizes to fit stock sizes of standard bolts and nuts with the pin hole punched therein. In practice the bolt and nut are applied in the usual manner with the nut screwed down tight to clamping position, or to any desired point, and then the saddle is seated on the nut. A hole of the required depth is then drilled in the end of the bolt, the saddle with its pin hole serving as a jig for the drill. A headed locking pin is then driven into the hole to firmly hold the saddle upon the end of the bolt or upon the top of the nut.

The saddle may be made in various forms. That is, instead of a simple strip of metal with two right-angle bends for engaging opposite flats of the nut, it may be cross-shaped to engage the four flats of a square nut, or opposite flats of octagon nuts, or the saddle may be of triangular shape to engage three flats of a hexagon nut. Or the saddle piece may have a single right-angle bend to engage only one flat of the nut, or the device may be in the form of a cap to fit and cover the entire nut and bolt end, the sides of the cap engaging all flats of the nut. In either case the saddle will be provided with a single hole for the locking pin.

The function of the headed locking pin is to hold the saddle in position on the nut, and due to its eccentric position in the bolt at a point between the bolt center and the saddle angle and on a line perpendicular thereto and passing through the bolt center prevents the saddle rotating with the nut on the bolt, and thereby locking the nut against rotation in either direction. It will be observed that any tendency of the nut turning on the bolt will tend to rotate the saddle with it, and that this rotary movement is resisted by the eccentric position of the pin, and therefore turning movement of the nut can only occur by actual shearing of the pin which would require a far greater force than would ordinarily be present tending to turn the nut in either direction on the bolt while in use.

My invention is illustrated in the accompanying drawing, in which,—

Figure 1 is an elevation representing any type of standard bolt and nut having my improved locking means applied thereto.

Figure 2 a top plan view of the nut and locking device.

Figure 3 a perspective view of the locking plate or saddle.

Figure 4 a sectional view of the threaded end of a bolt and nut screwed thereon and with the locking saddle in section showing the hole drilled eccentric to the axis of the bolt, and the locking pin before insertion for driving into the hole. In this view the bolt is shown projecting slightly above the top of the nut, as will frequently occur in use, and the saddle seated on the bolt end.

Figure 5 a sectional view showing the nut not fully screwed onto the bolt, as also occurs in use, and the saddle seated on the nut with the locking pin driven into the bolt.

Figures 6 and 7 sectional and plan views, respectively, of a saddle with a single locking flange.

Figure 8 an elevation showing two saddle pieces as in Figure 6 employed together to form a two-ended saddle piece, the pin holes registering for admittance of the single locking pin.

Figure 9 a sectional view illustrating the cap form of locking saddle.

Figures 10 and 11 are plan views of the cross and triangular forms of locking saddle, and Figure 12 illustrates a modified drive pin having an oval-head, and illustrating in dotted lines a ball-head.

Referring to the drawing, a bolt 1 and hexagon nut 2 of standard stock form are shown in Figure 1 with my locking saddle 3 and pin 4 applied thereto. The saddle 3 is made from a straight strip of metal bent with two right-angle sides 5, and pin hole 6 as seen in Figure 3. The saddle will be made in stock sizes of a width and length suitable for stock sizes of bolt nuts so that the sides 5 will closely fit over opposite flats of the nut as seen in Figure 1. In Figure 4 the nut is shown screwed down on the bolt to a point where the end of the bolt projects above the top of the nut. This may be the position where the bolt and nut firmly clamp two pieces together, or an adjusted position for allowing freedom of movement between two members hinged together by the bolt. The saddle is then placed in position over the nut and serves as a jig for a drill to drill the pin hole 7 in the end of the bolt to receive the locking pin 4.

Any suitable type of headed pin 4 may be employed, but I prefer to employ the type known as drive pins, that is, a pin with a fluted or spiral ribbed shank 8, Figures 4 and 12, and a reduced or pilot end 9. The pilot 9 will be of a diameter to fit hole 7 and the ribs or shank 8 when driven into the bolt will cause the metal cut by the ribs to flow into the valleys of the shank and thereby effect a tight anchoring of the pin in the bore of hole 7. In practice the hole 6 in the saddle may be of the same diameter as the bore 7 in the bolt and the pilot 9 of the locking pin, and hence the ribs on shank 8 will cut into the saddle and the surrounding metal will flow into the valleys as the pin is driven through the saddle as well as the metal of the bolt to effect a tight fit in both the bolt and saddle. However, if desired, the hole 6 may be of a diameter to receive the ribbed shank 8 as indicated in Figures 4 and 5 so that the ribs of the shank will cut only into the metal of the bolt as the pin enters the bore 7, but the ribs of the shank 8 above the bolt end will closely fit the hole 6 in the saddle. In either case the shank of the locking pin will have a close locking fit in the hole 7 and lock the saddle upon the nut, and thereby lock the nut against rotation on the bolt.

In Figures 6 and 7 I have shown the locking saddle as having a single side 5 and a pin hole 6 situated so as to be eccentric to the axis of the bolt and on a line perpendicular to the side 5 passing through the bolt center. This form will be effective for some uses, but of course, the saddle having sides contacting opposite flats of the nut will be more effective. The single side saddle may be employed in pairs to engage opposite flats of a nut by using two members 3 overlapping as illustrated in Figure 8, each having a single pin hole 6 located so as to register when drilling hole 7 in the bolt end and both secured by a single pin 4.

In Figure 9 I have shown the locking member in the form of a cap 10 which may be square, hexagonal or octagonal to fit standard nuts, a single pin hole 6 being provided for the locking pin. This form will be useful where it is desired to protect the nut and bolt end to prevent rusting.

In Figure 10 the locking saddle 3 is shown cross-shaped having four sides 5 and a single pin hole 6, the four sides being adapted to engage opposite flats of standard square or octagon nuts.

In Figure 11 the saddle is shown in triangular form having three sides 5 with a single pin hole 6, the sides being adapted to engage alternate flats of hexagon nuts.

In Figure 12 is shown a modified drive pin which may have either the fluted or spiral ribs, the head being shown as of oval form, or may, as shown in dotted lines be ball shaped. The purpose of this form is to facilitate removal of the pin when it is desired to unlock the nut. In either form of pin shown, the preferred manner of unlocking the saddle is to chip off the head with a chisel leaving the shank in the end of the bolt. With the form of pin shown in Figure 12, the bevel or rounded under part of the head permits the use of an ordinary claw tool for lifting the pin to extract it from the bolt. When the nut lock is released by chipping off the head of the pin, or by removal of the pin from the bolt, the nut may be unscrewed or tightened when necessary and relocked by drilling a new pin hole and driving in a new pin.

I am aware that it has been proposed to lock a nut on its bolt by employing a headed screw having an oppositely threaded shank screwed into a tapped hole in the end of the bolt and positioned eccentric to the axis of the bolt, the edge of the screw head seating on the upper face of the nut. This device requires the drilling and tapping of a hole and is not effective when the end of the bolt projects above the nut, that is to say, the end of the bolt must be flush with the top of the nut in order that the head of the screw will seat upon the nut. If the top of the nut is above the end of the bolt the tightening of the locking screw causes the head to chip away or causes fracture at the shank which soon causes the head to break off when the rotation of the nut produces upward pressure thereon. Furthermore, vibration causes loosening of the locking screw which permits rotation and loosening of the nut.

What I claim is:

1. In a nut lock, the combination with a standard bolt and nut, of a saddle having a substantially right-angled projection for engaging a flat of the nut, a pin-hole in the saddle eccentric to the axis of the bolt, said saddle and hole serving as a jig for drilling a hole in the end of the bolt, and a headed pin passing through the saddle hole into the drilled hole in the bolt end for securing the saddle in position over the nut, and said eccentrically seated pin locking the saddle and nut together against rotation on the bolt.

2. In a nut lock, the combination with a standard bolt and nut, of a saddle having sides engaging opposite flats of the nut, a pin hole in the saddle eccentric to the axis of the bolt, a hole drilled longitudinally in the bolt concentric with the pin-hole of the saddle, and a headed pin driven into said holes for securing the saddle in position over the nut and securing both the nut and saddle against rotation on the bolt.

3. In a nut lock, the combination with a standard bolt and nut, of a saddle having sides engaging opposite flats of the nut, a pin-hole in the saddle eccentric to the axis of the bolt and centered on a line perpendicular to said saddle sides and passing through the bolt center, a hole drilled longitudinally in the bolt concentric with the pin-hole of the saddle, and a headed pin driven into said holes for securing the saddle in position over the nut and securing both the nut and saddle against rotation on the bolt.

4. In a nut lock, the combination with a standard bolt and nut, of a saddle having sides engaging opposite flats of the nut, a pin-hole in the saddle eccentric to the axis of the bolt, a hole drilled longitudinally in the bolt concentric with the pin-hole of the saddle, and a headed pin having cutting ribs and pilot end driven into said holes for securing the saddle in position over the nut and securing both the nut and saddle against rotation on the bolt.

5. The method of locking a standard nut on a standard bolt, consisting in first screwing the nut on the bolt to the desired point, then applying a locking plate having a pin-hole eccentric to the axis of the bolt and an angular projection engaging one of the nut flats, then drilling a hole in the end of the bolt concentric with said pinhole, and then driving a headed pin into said holes to lock said plate and nut against rotation on the bolt.

ARTHUR J. HERSCHMANN.